(12) United States Patent
Ma et al.

(10) Patent No.: US 11,827,244 B2
(45) Date of Patent: Nov. 28, 2023

(54) ENHANCED VEHICLE OPERATION

(71) Applicant: Ford Global Technologies, LLC, Dearborn, MI (US)

(72) Inventors: Chenhao Ma, Canton, MI (US); Hamid M. Golgiri, Livonia, MI (US); Tony Tae-Jin Pak, Garden City, MI (US); Ahmed Benmimoun, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 17/111,728

(22) Filed: Dec. 4, 2020

(65) Prior Publication Data

US 2022/0177008 A1  Jun. 9, 2022

(51) Int. Cl.
| | |
|---|---|
| *B60W 60/00* | (2020.01) |
| *B60W 30/18* | (2012.01) |
| *G01C 21/00* | (2006.01) |
| *B60W 50/00* | (2006.01) |

(52) U.S. Cl.
CPC .... *B60W 60/00253* (2020.02); *B60W 30/181* (2013.01); *G01C 21/3885* (2020.08); *B60W 2050/0075* (2013.01); *B60W 2420/52* (2013.01); *B60W 2552/00* (2020.02); *B60W 2556/45* (2020.02)

(58) Field of Classification Search
CPC ......... B60W 60/00253; B60W 30/181; B60W 2552/00; B60W 2556/45; B60W 2050/0075; B60W 2420/52; G01C 21/3885
See application file for complete search history.

(56) References Cited

U.S. PATENT DOCUMENTS

| | | | | |
|---|---|---|---|---|
| 9,557,741 B1* | 1/2017 | Elie | .................. | G01B 11/22 |
| 9,581,997 B1* | 2/2017 | Penilla | ................ | G07C 5/008 |
| 9,719,801 B1* | 8/2017 | Ferguson | ............. | G01C 21/005 |
| 11,472,400 B2* | 10/2022 | Noguchi | ............... | G08G 1/149 |
| 2013/0147637 A1* | 6/2013 | Nielsen | ................ | G06Q 50/06 |
| | | | | 340/901 |
| 2017/0297625 A1* | 10/2017 | Irion | ..................... | G08G 1/148 |
| 2018/0165960 A1* | 6/2018 | Seo | ........................ | G08G 1/14 |
| 2018/0364328 A1* | 12/2018 | Mielenz | .................. | G01S 7/40 |
| 2019/0094025 A1 | 3/2019 | Lu et al. | | |
| 2019/0367012 A1* | 12/2019 | Matta | ................... | G05D 1/0274 |
| 2020/0148196 A1* | 5/2020 | Lim | ...................... | B60W 30/06 |

(Continued)

FOREIGN PATENT DOCUMENTS

| | | |
|---|---|---|
| CN | 108482366 A | 9/2018 |
| WO | 2020103456 A1 | 5/2020 |

*Primary Examiner* — Dale W Hilgendorf
*Assistant Examiner* — Hana Lee
(74) *Attorney, Agent, or Firm* — Frank A. MacKenzie; Bejin Bieneman PLC

(57) ABSTRACT

A computer includes a processor and a memory storing instructions executable by the processor to identify a current location of the vehicle in a map of a stopping area, collect data to calibrate a sensor while the vehicle is moving in the stopping area, calibrate the sensor based on the collected data, and actuate one or more vehicle components to move the vehicle to a stopping location in the stopping area based on the location of the vehicle in the map and data collected by the calibrated sensor.

14 Claims, 4 Drawing Sheets

(56) References Cited

U.S. PATENT DOCUMENTS

| | | |
|---|---|---|
| 2020/0174131 A1 | 6/2020 | Chen et al. |
| 2020/0184236 A1* | 6/2020 | Aguiar ................... G06T 7/80 |
| 2020/0207334 A1* | 7/2020 | Cho ................. B62D 15/0285 |
| 2020/0298836 A1* | 9/2020 | Kim ..................... G01C 21/005 |
| 2022/0024494 A1* | 1/2022 | Bonanni ................ B60L 53/14 |
| 2022/0076030 A1* | 3/2022 | Anguelov ............ G06V 10/803 |

* cited by examiner

ENHANCED VEHICLE OPERATION

BACKGROUND

Vehicles can be equipped with computing devices, networks, sensors and controllers to acquire data regarding the vehicle's environment and to operate the vehicle based on the data. Operation of the vehicle can rely upon acquiring accurate and timely data regarding a location of a vehicle in the environment. Acquiring accurately and timely data typically relies on sensors being accurately calibrated to provide data.

DETAILED DESCRIPTION

Figure 1:
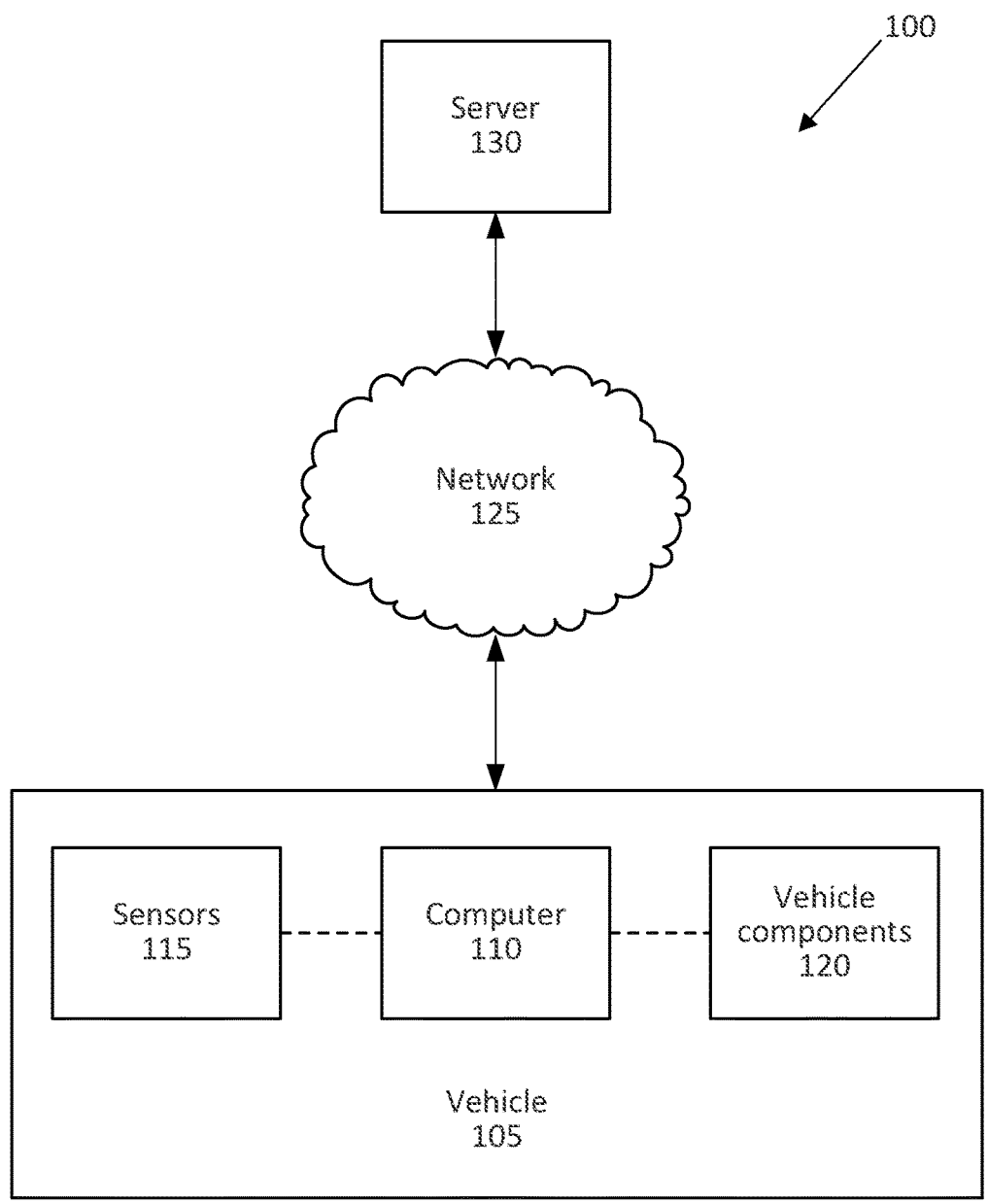
FIG. 1 is a block diagram of an example system for localizing a vehicle and calibrating a sensor of the vehicle.

A system includes a computer including a processor and a memory, the memory storing instructions executable by the processor to identify a current location of the vehicle in a map of a stopping area, collect data to calibrate a sensor while the vehicle is moving in the stopping area, calibrate the sensor based on the collected data, and actuate one or more vehicle components to move the vehicle to a stopping location in the stopping area based on the location of the vehicle in the map and data collected by the calibrated sensor.

The instructions can further include instructions to store calibration settings of the sensor in the memory based on the collected data, to receive a message to activate the vehicle, and to calibrate the sensor according to the calibration settings upon activation of the vehicle.

The instructions can further include instructions to identify a pickup location of an occupant in the map and to move the vehicle to the pickup location to receive the occupant based on data collected with the calibrated sensor.

The instructions can further include instructions to collect the data to calibrate the sensor when the vehicle is within a distance threshold of the stopping location.

The instructions can further include instructions to store calibration settings of the sensor in the memory, to deactivate the vehicle upon stopping in the stopping location, to receive a message to reactivate the vehicle, and to actuate the sensor according to the calibration settings upon reactivation of the vehicle.

The sensor can be a radar sensor and the instructions can further include instructions to actuate the radar sensor to collect radar data of the stopping area and to calibrate the radar sensor with the collected radar data.

The instructions can further include instructions to identify a dropoff location of an occupant in the vehicle and to collect the data to calibrate the sensor when the vehicle is within a distance threshold of the dropoff location.

The instructions can further include instructions to transition the vehicle to a fully autonomous mode when the vehicle stops at the dropoff location.

The instructions can further include instructions to identify the stopping location in the map, to actuate the calibrated sensor to collect data about the stopping location, and to actuate the one or more vehicle components to move the vehicle to the stopping location based on the collected data from the calibrated sensor.

The instructions can further include instructions to deactivate the vehicle upon stopping in the stopping location, to receive a message to activate the vehicle, to collect data about the stopping area with a second sensor, and to calibrate the sensor based on the collected data from the second sensor.

The instructions can further include instructions to deactivate the vehicle upon stopping in the stopping location, to receive a message to reactivate the vehicle, to identify a current location of the vehicle upon activating the vehicle, and to provide an output to an occupant when the current location of the vehicle is farther than a distance threshold of the stopping location.

The instructions can further include instructions to retrieve the map of the stopping area upon determining that a distance between the vehicle and the stopping area is less than a distance threshold.

A method includes identifying a current location of the vehicle in a map of a stopping area, collecting data to calibrate a sensor while the vehicle is moving in the stopping area, calibrating the sensor based on the collected data, and actuating one or more vehicle components to move the vehicle to a stopping location in the stopping area based on the location of the vehicle in the map and data collected by the calibrated sensor.

The method can further include storing calibration settings of the sensor in the memory based on the collected data, receiving a message to activate the vehicle, and calibrating the sensor according to the calibration settings upon activation of the vehicle.

The method can further include identifying a pickup location of an occupant in the map and moving the vehicle to the pickup location to receive the occupant based on data collected with the calibrated sensor The method can further include collecting the data to calibrate the sensor when the vehicle is within a distance threshold of the stopping location.

The method can further include storing calibration settings of the sensor in the memory, deactivating the vehicle upon stopping in the stopping location, receiving a message to reactivate the vehicle, and actuating the sensor according to the calibration settings upon reactivation of the vehicle.

The sensor can be a radar sensor, and the method can further include actuating the radar sensor to collect radar data of the stopping area and calibrating the radar sensor with the collected radar data.

The method can further include identifying a dropoff location of an occupant in the vehicle and collecting the data to calibrate the sensor when the vehicle is within a distance threshold of the dropoff location.

The method can further include transitioning the vehicle to a fully autonomous mode when the vehicle stops at the dropoff location.

The method can further include identifying the stopping location in the map, actuating the calibrated sensor to collect data about the stopping location, and actuating the one or more vehicle components to move the vehicle to the stopping location based on the collected data from the calibrated sensor.

The method can further include deactivating the vehicle upon stopping in the stopping location, receiving a message to activate the vehicle, collecting data about the stopping area with a second sensor, and calibrating the sensor based on the collected data from the second sensor.

The method can further include deactivating the vehicle upon stopping in the stopping location, receiving a message to reactivate the vehicle, identifying a current location of the vehicle upon activating the vehicle, and providing an output to an occupant when the current location of the vehicle is farther than a distance threshold of the stopping location.

The method can further include retrieving the map of the stopping area upon determining that a distance between the vehicle and the stopping area is less than a distance threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

One or more sensors of a vehicle can collect data while the vehicle operates autonomously. A computer in the vehicle can calibrate the sensors to collect accurate data. Certain sensors may use data collected while the vehicle is moving for calibration. For example, a radar sensor can use data collected while the vehicle is moving to calibrate time of flight between emission of radar electromagnetic (EM) waves and receipt of the radar EM waves. When the vehicle operates in a manual or semiautonomous mode, the vehicle may not collect data with the sensors, and when the vehicle transitions to an autonomous mode, the computer may lack the data to calibrate the sensors.

By collecting data with sensors during manual or semi-autonomous operation while the vehicle is moving, the computer can calibrate the sensors upon transitioning to autonomous operation. When the computer determines that autonomous operation may be imminent, e.g., upon entering a stopping area, the computer can collect data for calibrating the sensors and then can calibrate the sensors upon transitioning to autonomous operation. By collecting data while the vehicle is moving in the manual or semiautonomous mode, the computer can calibrate the sensors and then collect data with the calibrated sensors to operate the vehicle in the autonomous mode, providing a full sensor suite for use in the autonomous mode.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semiautonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle 105 propulsion, braking, and steering are controlled by the human operator.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
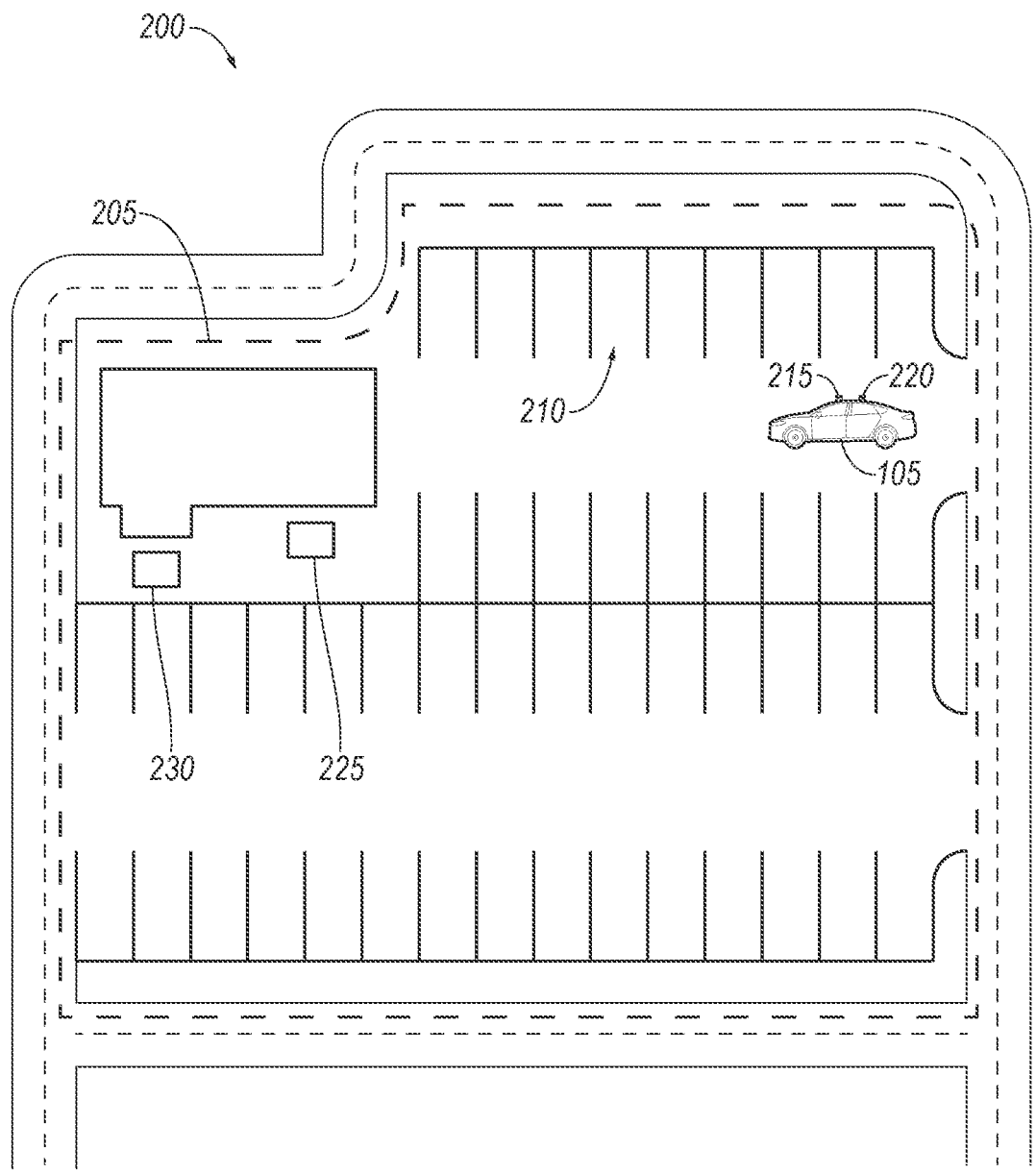
FIG. 2 is a top-down view of a stopping area in which the vehicle operates.

FIG. 2 is a top-down view of an example stopping area 200 for a vehicle 105. The stopping area 200 is a location in which vehicles 105 stop and can deactivate while users leave the vehicles 105. The stopping area 200 can be, e.g., a parking lot, a parking space on a roadway, a parking garage, etc. The computer 110 of the vehicle 105 can identify the stopping area 200. The computer 110 can receive geo-coordinates indicating a current location of the vehicle 105 and compare the current location of the vehicle 105 to stored geo-coordinates of each of a plurality of stopping areas 200 stored in the memory. When a distance between the current location of the vehicle 105 and stored geo-coordinates of one of the plurality of stopping areas 200 is less than a distance threshold, the computer 110 can determine that the vehicle 105 is entering the stopping area 200.

When the computer 105 identifies the stopping area 200 into which the vehicle is entering, the computer 110 can retrieve a map 205 of the stopping area 200 from an external server 130. A "map" 205 is a set of data of the stopping area 200 that describing location and identifying data of objects and structures in the stopping area 200. The objects and structures can include, e.g., stopping locations 210, buildings, non-drivable areas such as sidewalks, markings indicating boundaries of the stopping locations 210, etc. The map 205 can include data not typically available in the geo-coordinates collected by the vehicle 105, e.g., geo-coordinates at a finer resolution than collected from an external server 130, the data of the objects and structures, etc. The computer 110 can use the map 205 to move the vehicle 105 to specific locations in the stopping area 200 without retrieving additional data from the server 130. The computer 110 can identify a current location of the vehicle 105 in the map 205 and then use data in the map 205 to operate the vehicle 105. For example, the computer 110 can determine a location of a stopping location 210 in the map 205 relative to the location of the vehicle 105 in the map 205, and the computer 110 can actuate one or more components 120 to move the vehicle 105 to the stopping location 210 based on data in the map 205.

The computer 110 can localize the vehicle 105. To "localize" the vehicle 105 means to determine the location of the vehicle 105. To localize the vehicle 105, the computer 110 can identify the geo-coordinates of the location of the vehicle 105 relative to one or more predetermined objects (e.g., landmarks). In this context, a "landmark" is a stationary object, e.g., a tree, a lamp post, a post box, etc., and the server 130 can provide geo-coordinates of the landmark to the computer 110. The computer 110 can collect geo-coordinate data of the landmark and then can actuate one or more sensors 115 to determine the location of the vehicle 105 relative to the landmark. That is, the geo-coordinate data from the server 130 can include geo-coordinates of the vehicle 105 within a first resolution threshold (e.g., 5 meters) and geo-coordinates of the landmark within a second resolution threshold (e.g., 0.1 meters). The data from the sensors 115 may have a finer resolution than the geo-coordinates of the landmark, and the computer 110 can determine a relative distance between the landmark and the vehicle 105 based on the data from the sensors 115. The computer 110 can determine the location of the vehicle 105 based on the geo-coordinate data of the landmark from the server 130 and the relative distance between the vehicle 105 and the landmark determined by data from the sensors 115 according to a conventional distance determining technique, e.g. a Euclidean distance formula.

The computer 110 can determine to calibrate one or more sensors 115 upon determining that the vehicle 105 will enter the stopping area 200. Certain sensors 115 use data collected while the vehicle 105 is moving for calibration. For example, the computer 110 can apply a conventional calibration technique to a radar sensor 215 shown in FIG. 2 that uses the Doppler effect to calibrate the radar sensor 215. The computer 110 can use radar data collected from different locations while the vehicle 105 is moving, the radar data including different detections of a relative distance between the vehicle 105 and an object, e.g., a landmark as described above. The computer 110 can use the data from the radar sensor 215 to generate a three-dimensional boundary enclosing the landmark, i.e., a "bounding box." To generate the three-dimensional bounding box, the computer 110 collects radar data of the landmark as the vehicle 105 moves relative to the landmark, the radar data indicating a relative distance between the vehicle 105 and the landmark. Based on the relative distances, the computer 110 generates the three-dimensional bounding box enclosing the landmark, and as the computer 110 collects more radar data, a volume of the three-dimensional bounding box changes to enclose only the landmark. The computer 110 can determine that the radar sensor 215 is calibrated when the change of the volume of the three-dimensional bounding box between successive data points collected by the radar sensor 215 is below a threshold, e.g., 0.01 cubic meters.

The computer 110 can, upon determining that the vehicle 105 is entering a stopping area 200, actuate the radar sensor 215 to collect data while the vehicle 105 is moving. Upon collecting the data, the computer 110 can calibrate the radar sensor 215 based on the collected data. Because the occupant is operating the vehicle 105 upon entering the stopping area 200, the radar sensor 215 may be deactivated prior to the computer 110 determining to calibrate the radar sensor 215. Then, upon entering the stopping area 200, the occupant may leave the vehicle 105 and transition the vehicle 105 to a fully autonomous mode that uses data from the radar sensor 215. When the computer 110 predicts that the occupant will transition the vehicle 105 to the fully autonomous mode, the computer 110 can calibrate the radar sensor 215 with data collected while the vehicle 105 was moving under control of the occupant. Thus, the radar sensor 215 can be calibrated before the occupant transitions the vehicle 105 to the fully autonomous mode.

The computer 110 can actuate a second sensor 220 to collect data to calibrate the radar sensor 215. The second sensor 220 can collect a different type of data than the sensor 215. For example, the second sensor 220 can be a lidar that collects lidar data. Upon entering the stopping area 200, the computer 110 can actuate the second sensor 220 to collect data about the stopping area 200 while the vehicle 105 is moving. The computer 110 can use the data from the second sensor 220 to calibrate the sensor 215. For example, the computer 110 can use point cloud data collected by the lidar sensor 220 to calibrate the radar sensor 215.

The computer 110 can identify a stopping location 210 in the stopping area 200. A "stopping location" is a location in the stopping area at which the vehicle 105 is permitted to power off and remain stopped. The stopping area can be, e.g., a parking space demarcated by space markings. FIG. 2 illustrates one example stopping location 210 as a parking space, and the stopping area 200 can include a plurality of stopping locations 210 in which the vehicle 105 can park. The computer 110 can actuate one or more vehicle components 120 to move the vehicle 105 to the stopping location 210. The computer 110 can compare a current location of the vehicle 105 in the map 205 to a location of the stopping location 210 in the map 205 and can plan a path to the stopping location 210. The computer 110 can collect data with, e.g., the calibrated sensor 215, the second sensor 220, other sensors 115, etc., about the stopping location. Based on the data collected by the sensors 115, 215, 220, the computer 110 can actuate the components 120 to follow the path to the stopping location 210. Upon entering the stopping location 210, the computer 110 can deactivate the vehicle 105.

The computer 110 can identify a dropoff location 225 at which an occupant of the vehicle 105 can leave the vehicle 105. The "dropoff location" is a location in the map 205 at which occupants can leave vehicles 105. Because the vehicle 105 may be in the semiautonomous mode prior to arriving at the dropoff location 225, after dropping off the occupant, the vehicle 105 can transition to the fully autonomous mode to move to the stopping location 210. Because the vehicle 105 may use data from the sensor 215 to move to the stopping location 210, the computer 110 can determine to calibrate the sensor 215 when the vehicle is within a distance threshold of the dropoff location 225. The distance threshold can be, e.g., based on a posted speed limit in the stopping area 200 and a specified amount of time to calibrate the sensor 215. By calibrating the sensor 215 prior to arriving at the dropoff location 225 and before the vehicle is in a fully autonomous mode, the computer 110 can then use data from the calibrated sensor 215 to move the vehicle 110 from the dropoff location 225 to the stopping location 210 in a fully autonomous mode. That is, the computer 110 can prepare the sensor 215 to detect the dropoff location 225 before the occupant determines to transition the vehicle 105 to the autonomous mode to be dropped off at the dropoff location 225. Then, when the occupant determines that the vehicle 105 should drop off the occupant at the dropoff location 225, the computer 110 can actuate the sensor 215 that has already been powered and calibrated to drop off the occupant at the dropoff location 225.

Upon calibrating the sensor 215 with the collected data, the computer 110 can store in a memory calibration settings used to calibrate the sensor 215. The "calibration settings" are settings that the computer 110 can use to operate the sensor 215, e.g., the three-dimensional bounding boxes of the landmarks described above, location data of the vehicle 105 determined based on the landmark data, etc. That is, the calibration settings can include environmental data (e.g., data describing landmarks in the stopping area 200) and localization data (e.g., location data of the landmarks and the vehicle 105 in the stopping area 200, location data in the map 205, etc.) With the calibration settings, the computer 110 can operate the sensor 215 without collecting additional data while the vehicle 105 is moving. For example, after stopping the vehicle 105 in the stopping location 210 and powering off, the computer 110 can use the calibration settings to collect data with the sensor 215 upon reactivation of the vehicle 105 and prior to moving the vehicle 105 out of the stopping location 210. The server 130 and/or a portable device of the occupant can send the message over the network 125 to the computer 110, e.g., using a remote vehicle start program. When the computer 110 receives the message from the server 130 and/or the portable device, the computer 110 can actuate the sensor 215 according to the calibration settings prior to moving the vehicle 105, i.e., the computer 110 can use the calibration settings to operate the sensor 215. The computer 110 can actuate the sensor 215 to collect data around the vehicle 105, and the computer 110 can use the collected data to move the vehicle 105 out from the stopping location 210.

The computer 110 can identify a pickup location 230 at which the occupant (or occupants) can enter the vehicle 105. The "pickup location" is a location in the map 205 at which occupants can enter vehicles 105. The computer 110 can operate the vehicle 105 in the fully autonomous mode to move the vehicle 105 to the pickup location 230 to receive the occupant(s). The computer 110 can collect data with the calibrated sensor 215 about the pickup location 230, and based on the collected data, the computer 110 can actuate one or more components 120 to move the vehicle 105 to the pickup location 230. Upon arriving at the pickup location 230, the occupant can enter the vehicle 105 and assume manual or semiautonomous control of the vehicle 105. That is, the computer 110 can transition from the fully autonomous mode to the manual mode or the semiautonomous mode, receiving input from the occupant to operate the vehicle 105. The computer 110 can deactivate the sensor 215 upon transitioning to the manual mode or the semiautonomous mode.

The computer 110 can, upon reactivation, determine whether the vehicle 105 has moved from the stopping location 210. For example, the vehicle 105 may have been towed while deactivated. The computer 110 can determine a current location of the vehicle 105 upon reactivation. If the location of the vehicle 105 is farther than a distance threshold of the stopping location 210, the computer 110 can provide an output to the occupant. For example, the computer 110 can send a message to a portable device of the occupant with the current location of the vehicle 105 and an alert that the vehicle 105 was moved while deactivated.

Figure 3:
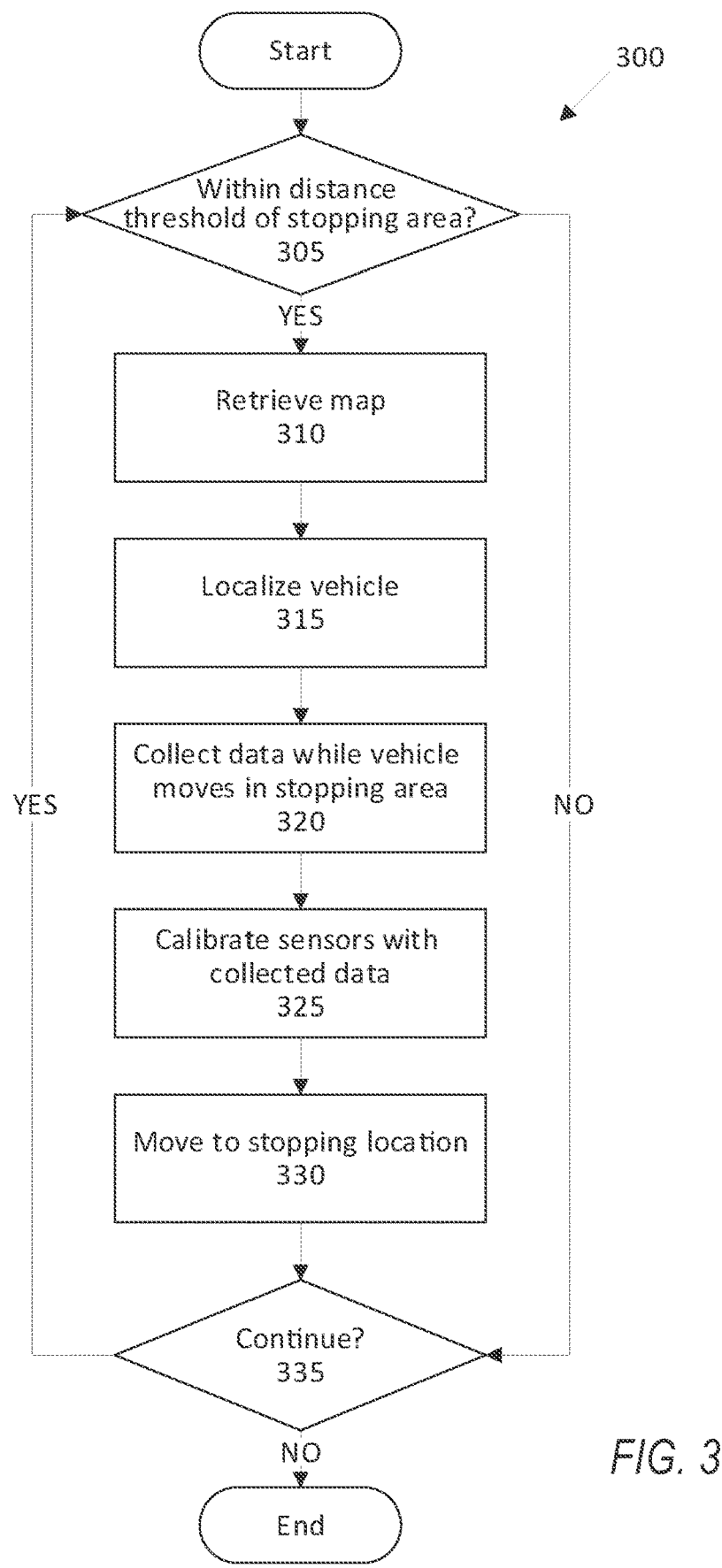
FIG. 3 is a block diagram of an example process for localizing the vehicle and calibrating the sensor of the vehicle.

FIG. 3 is a block diagram of an example process 300 for operating a vehicle 105 including performing sensor calibration. The process 300 begins in a block 305, in which a computer 110 determines whether the vehicle 105 is within a distance threshold of a stopping area 200. As described above, the computer 110 can compare geo-coordinates of a current location of the vehicle 105 to geo-coordinates of a plurality of stopping areas 200 and can determine a distance between the vehicle 105 and one of the stopping areas 200. If the vehicle 105 is within the distance threshold of a stopping area 200, the process 300 continues in a block 310. Otherwise, the process 300 continues in a block 335.

Next, in a block 310, the computer 110 retrieves a map 205 of the stopping area 200. The map 205 of the stopping area 200 is a set of data including location coordinates of objects in the stopping area 200 and data about the objects in the stopping area 200. For example, the map 205 can include data about, e.g., stopping locations 210, dropoff locations 225, pickup locations 230, buildings, areas where vehicles 105 are not permitted to operate, etc.

Next, in a block 315, the computer 110 localizes the vehicle 105. As described above, to "localize" the vehicle 105 means to identify a location of the vehicle 105 in relative to other nearby objects. The computer 110 can localize the vehicle 105 by inputting geo-coordinates of the vehicle 105, geo-coordinates of an object (such as a landmark described above), and data from a sensor 115 indicating a relative distance between the vehicle 105 and the object to a conventional localization program, e.g., a Euclidean distance algorithm.

Next, in a block 320, the computer 110 actuates the sensor 215 to collect data while the vehicle 105 moves in the stopping area 200. As described above, the sensor 215 uses data while the vehicle 105 moves for calibration. As the occupant moves the vehicle 105 in the stopping area 200, the sensor 215 collects data about the stopping area 200. For example, the sensor 215 can collect data about a landmark, as described above.

Next, in a block 325, the computer 110 calibrates the sensor 215 with the collected data. As described above, the computer 110 can use the data collected at different geo-coordinates to calibrate a radar sensor 215. The computer 110 can generate a three-dimensional bounding box enclosing a landmark, as described above, to calibrate the radar sensor 215. The computer 110 can store calibration settings that include the three-dimensional bounding box in a memory.

Next, in a block 330, the computer 110 collects data with the calibrated sensor 215 and moves to a stopping location 210. As described below, after the occupant leaves the vehicle 105, the computer 110 can autonomously move to the stopping location 210. Operating in the autonomous mode, the computer 110 can use data from the calibrated sensor 215 to move the vehicle 105 to the stopping location 210.

In the block 335, the computer 110 determines whether to continue the process 300. For example, the computer 110 can determine to continue the process 300 when the vehicle 105 is still on a path that may end at a stopping area 200. In another example, the computer 110 can determine not to continue the process 300 when operating in a fully autonomous mode in which the sensor 215 is already calibrated. If the computer 110 determines to continue, the process 300 returns to the block 305. Otherwise, the process 300 ends.

Figure 4:
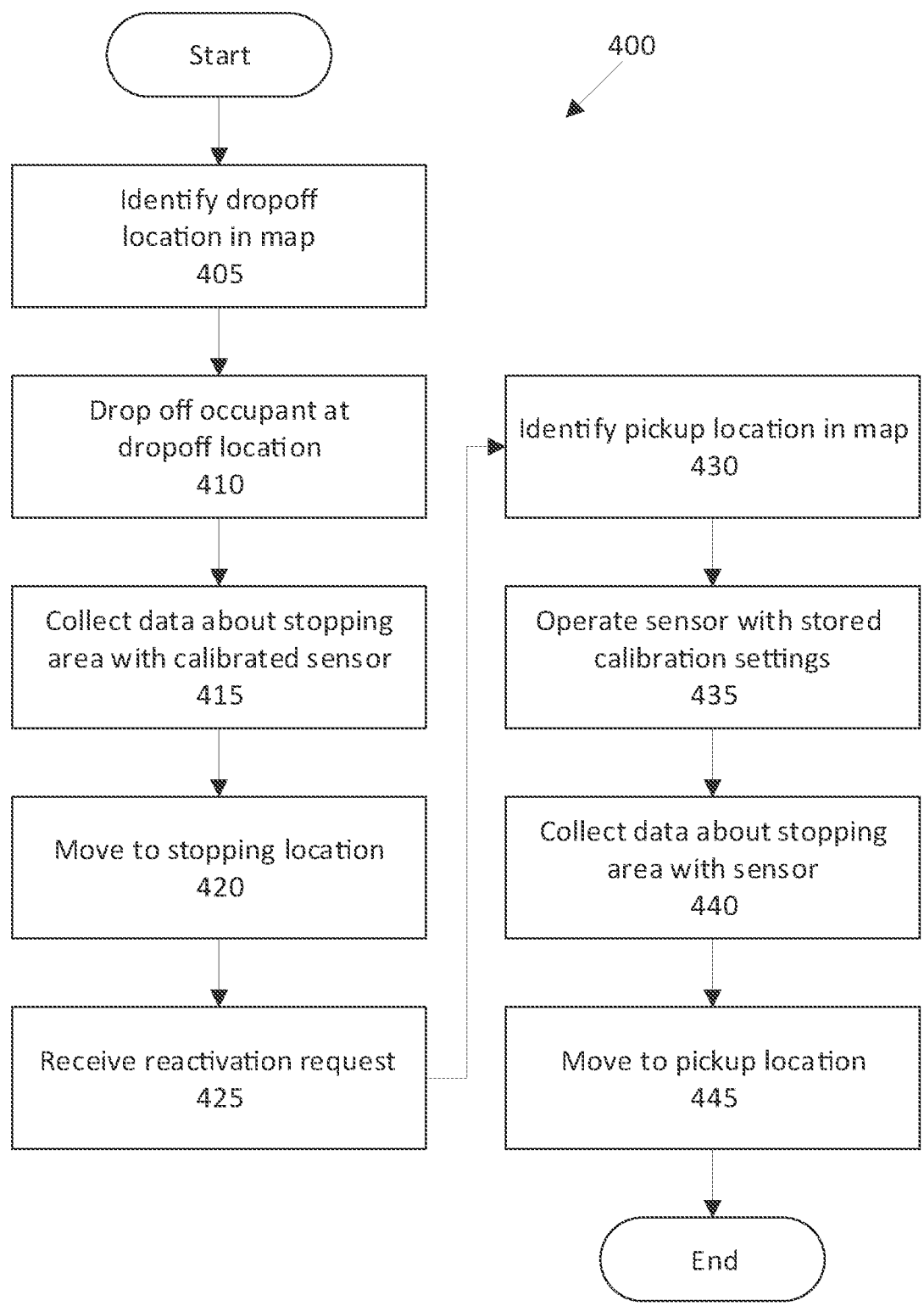
FIG. 4 is a block diagram of an example process for dropping off and picking up an occupant of the vehicle.

FIG. 4 is a block diagram of an example process 400 for dropping off and picking up an occupant in a stopping area 200. The process 400 begins in a block 405, in which a computer 110 identifies a dropoff location 225 in a map 205 of a stopping area 200. As described above, the dropoff location 225 is a location at which occupants can exit a vehicle 105 to enter another structure, e.g., a building. The computer 110 identifies the dropoff location 225 as a set of geo-coordinates in the map 205.

Next, in a block 410, the vehicle 105 moves to the dropoff location 225 to allow the occupant to exit the vehicle 105, i.e., to drop off the occupant. The occupant can move the vehicle 105 operating in a semiautonomous mode or a manual mode with some or no input from the computer 110. When the occupant leaves the vehicle 105, the computer 110 transitions the vehicle 105 to a fully autonomous mode, as described above. In the fully autonomous mode, the computer 110 operates the vehicle 105 without input from the occupant that exited the vehicle 105.

Next, in a block 415, the computer 110 collects data about the stopping area 200 with a calibrated sensor 215. As described above and shown in FIG. 3, the computer 110 can calibrate a sensor 215 while the vehicle 105 moves to collect data when the vehicle 105 operates in the fully autonomous mode. The computer 110 can collect data about a stopping location 210 in the stopping area 200 in which the vehicle 105 can park.

Next, in a block 420, the computer 110 actuates one or more components 120 to move the vehicle 105 to the stopping location 210. The computer 110 can, using data collected by the calibrated sensor 215, actuate a steering, a propulsion, and a brake to move the vehicle 105 from the dropoff location 225 to the stopping location 210. For example, the computer 110 can plan a conventional path planning algorithm to plan a path using the dropoff location 225 as an origin and the stopping location 210 as a destination. The computer 110 then deactivates the vehicle 105, powering the vehicle 105 off.

Next, in a block 425, the computer 110 receives a request to activate the vehicle 105, i.e., a reactivation request. The occupant can send the reactivation request as a message from a user device over a network 125 to the computer 110. For example, the occupant can send the reactivation request through a dedicated application on a smartphone over a wireless communications network. The computer 110 can receive the message and activate the vehicle 105, powering on the components 120 in preparation to receive the occupant.

Next, in a block 430, the computer 110 identifies a pickup location 230 in the map 205 of the stopping area 200. As described above, the pickup location 230 is a location at which the occupant can enter the vehicle 105, i.e., a location at which the vehicle 105 picks up the occupant. The pickup location 230 can be included in the reactivation request sent by the occupant. Alternatively or additionally, the pickup location 230 can be a predetermined location in the map 205.

Next, in a block 435, the computer 110 operates the sensor 215 with stored calibration settings. As described above, the "calibration settings" are the localization data and/or environmental data collected by the computer 110 prior to deactivating the vehicle 105 to calibrate the sensor 215. The computer 110 stores the calibration settings to calibrate the sensor 215 upon reactivation. Because the vehicle 105 has not moved since activation, the computer 110 has no current data collected while the vehicle 105 moved to generate a bounding box of a landmark to calibrate the sensor 215. Thus, the computer 110 uses the previously collected localization and environmental data to operate the sensor 215.

Next, in a block 440, the computer 110 collects data about the stopping area 205 with the sensor 215. The computer 110 can collect data about the pickup location 230, objects between the vehicle 105 and the pickup location 230, etc. Because the sensor 215 is calibrated, the computer 110 can collect data with the sensor 215 even though the vehicle 105 has not moved since activation.

Next, in a block 445, the computer 110 actuates one or more components 120 to move the vehicle 105 to the pickup location 230. The computer 110 can use the data collected with the sensor 215 to actuate a propulsion, a steering, and a brake to move from the stopping location 210 to the pickup location 230. For example, the computer 110 can use the path planning algorithm described above with the stopping location 210 as the origin and the pickup location 230 as the destination. Upon arriving at the pickup location 230 and receiving the occupant, the process 400 ends.

The computer 110 can implement the entire process 400 to drop off and pick up the occupant. Alternatively or additionally, the computer 110 can perform less than all the steps in the process 400, e.g., only blocks 405-420 to drop off the occupant at the dropoff location 225, only blocks 425-445 to pick up the occupant at the pickup location 230, etc. For example, after being dropped off at the dropoff location 225, the occupant may not send the request to reactivate the vehicle 105 and may reactivate the vehicle 105 manually, and the computer 110 may not perform blocks 425-445 of the process 400.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

The invention claimed is:

1. A system, comprising a computer including a processor and a memory, the memory storing instructions executable by the processor to:
   identify a current location of a vehicle, and a dropoff location of an occupant in the vehicle, in a map of a stopping area;
   collect data to calibrate a sensor while the vehicle is moving in the stopping area and is operating within a distance threshold of the dropoff location in a non-autonomous or semi-autonomous mode that obtains operator input;
   calibrate the sensor based on the collected data prior to arriving at the dropoff location;
   after stopping at the dropoff location, end collecting the data and calibrating the sensor, and transition the vehicle to a fully autonomous mode from the non-autonomous or semi-autonomous mode that obtains operator input; and
   actuate one or more vehicle components to move the vehicle to, and stop at, the stopping location in the stopping area based on the location of the vehicle in the map and data collected by the calibrated sensor.

2. The system of claim 1, wherein the instructions further include instructions to store calibration settings of the sensor in the memory based on the collected data, to receive a message to activate the vehicle, and to calibrate the sensor according to the calibration settings upon activation of the vehicle.

3. The system of claim 2, wherein the instructions further include instructions to identify a pickup location of an occupant in the map and to move the vehicle to the pickup location to receive the occupant based on data collected with the calibrated sensor.

4. The system of claim 1, wherein the instructions further include instructions to store calibration settings of the sensor in the memory, to deactivate the vehicle upon stopping in the stopping location, to receive a message to reactivate the vehicle, and to actuate the sensor according to the calibration settings upon reactivation of the vehicle.

5. The system of claim 1, wherein the sensor is a radar sensor and the instructions further include instructions to actuate the radar sensor to collect radar data of the stopping area and to calibrate the radar sensor with the collected radar data.

6. The system of claim 1, wherein the instructions further include instructions to deactivate the vehicle upon stopping in the stopping location, to receive a message to reactivate the vehicle, to identify a current location of the vehicle upon activating the vehicle, and to provide an output to an occupant when the current location of the vehicle is farther than a distance threshold of the stopping location.

7. The system of claim 1, wherein the instructions further include instructions to retrieve the map of the stopping area upon determining that a distance between the vehicle and the stopping area is less than a distance threshold.

8. The system of claim 1, wherein the instructions further include instructions to:
deactivate the vehicle upon stopping in the stopping location;
receive a message to reactivate the vehicle;
reactivate the vehicle in response to the message and then collect data about the stopping area with a second sensor; and calibrate the sensor based on the collected data from the second sensor.

9. A method, comprising:
identifying a current location of a vehicle, and a dropoff location of an occupant in the vehicle, in a map of a stopping area;
collecting data to calibrate a sensor while the vehicle is moving in the stopping area and is operating within a distance threshold of the dropoff location in a non-autonomous or semi-autonomous mode that obtains operator input;
calibrating the sensor based on the collected data prior to arriving at the dropoff location;
after stopping at the dropoff location, ending collecting the data and calibrating the sensor, and transitioning the vehicle to a fully autonomous mode from the non-autonomous or semi-autonomous mode that obtains operator input; and
actuating one or more vehicle components to move the vehicle to, and stop at, the stopping location in the stopping area based on the location of the vehicle in the map and data collected by the calibrated sensor.

10. The method of claim 9, further comprising storing calibration settings of the sensor in the memory based on the collected data, receiving a message to activate the vehicle, and calibrating the sensor according to the calibration settings upon activation of the vehicle.

11. The method of claim 10, further comprising identifying a pickup location of an occupant in the map and moving the vehicle to the pickup location to receive the occupant based on data collected with the calibrated sensor.

12. The method of claim 9, further comprising storing calibration settings of the sensor in the memory, deactivating the vehicle upon stopping in the stopping location, receiving a message to reactivate the vehicle, and actuating the sensor according to the calibration settings upon reactivation of the vehicle.

13. The method of claim 9, further comprising:
deactivating the vehicle upon stopping in the stopping location;
receiving a message to reactivate the vehicle;
reactivating the vehicle in response to the message and then collect data about the stopping area with a second sensor; and calibrating the sensor based on the collected data from the second sensor.

14. The method of claim 9, further comprising deactivating the vehicle upon stopping in the stopping location, receiving a message to reactivate the vehicle, identifying a current location of the vehicle upon activating the vehicle, and providing an output to an occupant when the current location of the vehicle is farther than a distance threshold of the stopping location.

* * * * *